(12) United States Patent
Rao

(10) Patent No.: US 7,780,152 B2
(45) Date of Patent: Aug. 24, 2010

(54) DIRECT COMBUSTION STEAM GENERATOR

(75) Inventor: Dandina N. Rao, Baton Rouge, LA (US)

(73) Assignee: Hydroflame Technologies, LLC, Baton Rouge, LA (US)

( * ) Notice: Subject to any disclaimer, the term of this patent is extended or adjusted under 35 U.S.C. 154(b) by 898 days.

(21) Appl. No.: 11/650,980

(22) Filed: Jan. 9, 2007

(65) Prior Publication Data

US 2007/0202452 A1 Aug. 30, 2007

Related U.S. Application Data

(60) Provisional application No. 60/757,030, filed on Jan. 9, 2006.

(51) Int. Cl.
*B05B 7/10* (2006.01)
(52) U.S. Cl. .................. 261/79.1; 166/272.3; 431/354; 60/775
(58) Field of Classification Search ............... 261/79.1, 261/79.2, 143, DIG. 10, DIG. 76; 166/272.3, 166/58, 59; 126/360.1, 360.2; 60/775, 39.3, 60/39.53, 39.55, 39.56, 39.57, 39.59, 730; 122/39.41, 412, 414, 448.1; 431/354, 4, 431/158
See application file for complete search history.

(56) References Cited

U.S. PATENT DOCUMENTS

| | | | | |
|---|---|---|---|---|
| 3,761,065 A * | 9/1973 | Rich et al. ............... 261/76 |
| 4,077,469 A * | 3/1978 | Hamrick et al. ............... 166/59 |
| 4,366,860 A * | 1/1983 | Donaldson et al. ............ 166/59 |
| 4,380,267 A * | 4/1983 | Fox ............................. 166/303 |
| 4,382,771 A * | 5/1983 | Carr ............................ 431/158 |
| 4,385,661 A * | 5/1983 | Fox ............................. 166/59 |
| 4,397,356 A * | 8/1983 | Retallick ..................... 166/303 |
| 4,452,309 A * | 6/1984 | Widmyer ..................... 166/303 |
| 4,540,052 A * | 9/1985 | Hitzman ..................... 166/303 |
| 4,545,430 A * | 10/1985 | Retallick ..................... 166/59 |
| 4,604,988 A | 8/1986 | Rao |
| 4,648,835 A * | 3/1987 | Eisenhawer et al. ............ 431/4 |
| 4,682,471 A * | 7/1987 | Wagner ........................ 60/649 |
| 4,861,263 A * | 8/1989 | Schirmer ..................... 431/158 |
| 4,930,454 A * | 6/1990 | Latty et al. .................. 122/4 D |
| 5,224,542 A * | 7/1993 | Hemsath ....................... 166/59 |
| 5,417,283 A * | 5/1995 | Ejiogu et al. ............. 166/272.3 |
| 6,016,868 A * | 1/2000 | Gregoli et al. ............. 166/261 |
| 6,082,712 A | 7/2000 | Cincotta et al. |
| 6,877,978 B2 * | 4/2005 | Sirignano et al. ............... 431/4 |
| 2001/0044086 A1 * | 11/2001 | Edlinger ..................... 431/158 |

* cited by examiner

*Primary Examiner*—William H Rodríguez
(74) *Attorney, Agent, or Firm*—Buchanan Ingersoll & Rooney PC

(57) ABSTRACT

A method and apparatus for generating steam by heating water with a flame is provided. The water is introduced into a vortex sustaining container and flows through the container in a spiraling manner creating a liquid vortex with an open axial core. The flame effects heat transfer and is the product of the ignition of fuel mixed with a tangentially swirling oxygen containing gas.

35 Claims, 8 Drawing Sheets

DIRECT COMBUSTION STEAM GENERATOR

CROSS REFERENCE TO RELATED APPLICATION

This application claims the benefit of U.S. Provisional Application No. 60/757,030, filed on Jan. 9, 2006, and is incorporated herein by reference in its entirety.

BACKGROUND OF THE INVENTION

1. Field of the Invention

This invention relates to an apparatus and method by which streams of gas and liquid may be introduced into a contact zone in a controlled manner in order to facilitate physical or chemical reactions between the two flows. More particularly, this invention relates to the containment of a flame within a surrounding continuous surface of flowing liquid, and to means by which heat from the products of combustion may be transferred to a liquid. Particular applicability is found in generating steam in compact space.

2. Description of the Related Art

It is often desirable to bring together a stream of gas with a stream of liquid in order that a chemical or physical reaction or mass transfer may take place between the two streams. One particular example of such a condition is the contacting of the products of combustion arising from a flame with a liquid, e.g., water, in order to transfer heat to the liquid. Other examples include the contacting of a cooling refrigerant gas with a liquid in order to cool the liquid or the absorption of carbon dioxide or hydrogen sulfide from acid gas by contacting with ethanolamines or gylcols.

When gases and liquids are to be contacted in order to precipitate a chemical or physical reaction, the rate at which the process proceeds depends upon the surface area over which such contacting occurs. In such cases, in order to obtain high rates it is desirable to maximize this contact surface area.

Direct contact heat transfer (DCHT) is the technique by which heating and heated materials are brought into intimate contact with each other without the presence of an intermediate heat transfer surface or barrier. One example of DCHT is in the heating of fluids, primarily water, by the direct contacting of the products of combustion with the liquid. Steam can be raised by spraying water into a stream of hot gases issuing from a burner. Alternatively, hot gas streams generated by combustion can be bubbled through a liquid using submerged combustion heaters to effect heat transfer. Maximization of contact surface area is a desirable objective in each of these cases.

In the case of submerged combustion heaters, the flame or combustion zone is separated from the fluid by a protective tube or cylinder which acts as a shroud or shield. Such shielding elements are often susceptible to severe scaling and corrosion. Similar problems are typical in the case of downhole steam generators for use in injecting heated water or steam into oil-bearing underground formations. The annular metallic sleeves which surround the flame and transport water to the exhaust gas zone in downhole or surface heaters suffer particularly from severe thermal stress related problems of fatigue and cracking.

When a flame is contained within a protective shroud the shroud may on occasion be raised to very high temperatures. Where cooling is not provided the shroud may become glowing hot or even white hot. Where metals are used in such circumstances, cooling is provided to limit rapid deterioration of the metal in the shroud. When cooling, usually in the form of circulating water, is applied to the exterior surface of the flame shroud, steep thermal gradients are formed within the shroud wall. This can lead to metal fatigue and failure of the mechanical integrity of the shroud wall.

The same fatigue and cracking problems arise when unquenched combustion exhaust gases are introduced into contact columns where direct contact cooling occurs. To protect trays and other contact surfaces within such columns, it is often necessary to pre-cool combustion gases.

U.S. Pat. No. 4,604,988 describes an apparatus and method for overcoming such problems, which is of particular applicability to heating water. However, the method as described therein is not of sufficient efficiency for generating steam.

The heavy oils of Western Canada, U.S.A., Venezuela and other parts of the world, and the oil in the oil-sands of Alberta, are too viscous to flow in their naturally occurring state. They need to be heated by some suitable technique in order to make them flow to the producing wells. Over 95% of such heavy oils recovered in the U.S. since 1980 is due to steam injection into these heavy oil formations. Such steam generators transfer heat to the water from the flame and hot combustion gases in the radiant and convection sections of once—through type oil fields stream generators to convert water to steam. It should be noted that the entire tube bundle in the radiant section is exposed to the flame. If the inside tube walls become dry due to water evaporation, hotspots would result eventually causing tube rupture. After transferring their heat in the convection section, the hot gases exit through the stack constituting the major heat loss associated with such steam generators.

The conventional generator looses about 20% of the fuel energy through stack gases, 5-20% through surface piping, and 10% or more in the well bore. Thus, the percentage of energy reaching the oil formation is less than 60% of that in the fuel. The downhole steam generator is located downhole at the sandface and thereby eliminates all the heat losses. This results in 100% of the energy content of the steam and combustion gases being applied to the formation to heat the oil. The only significant energy loss is the fuel energy used by the air compressor and is about 25% of the total energy consumption.

Another significant difference between the conventional surface steam generator (SSG) and the downhole steam generator (DSG) is the fact that a DSG injects all the gases of combustion into the formation along with the steam, while the SSG exhausts the gases to the atmosphere causing environmental problems. The gases injected amount to approximately 3600 scf per barrel of steam. The gases introduce recovery mechanisms in addition to the viscosity reduction associated with the injection of steam alone. The additional recovery mechanisms include: increased reservoir pressure, movement of oil through viscous drag, reduction of oil viscosity and swelling of the oil through gas solubility.

Furthermore, the injection of gases downhole are known to reduce air quality problems associated with the surface steam generators. Environmental concerns will have a significant impact on oil/gas recovery operations in Canada and the U.S. in the future. However, downhole steam generation techniques appear to meet that challenge as well.

The Department of Energy in the U.S. contracted the Sandia National Laboratories to develop a downhole steam generator. The Sandia Labs team developed a downhole steam generator and field-tested it in Long Beach, Calif.

The Sandia design differs markedly from the process described in U.S. Pat. No. 4,604,988, in that the flame is surrounded by metal walls which are cooled from the outside by circulating water through the sleeves around the combustion chamber. All other designs of DSGs make use of a similar cooling technique. This leaves the metal surfaces of the burner exposed to the high temperature flame on the inside while the outside is cooled by the circulating water. Thus, enormous temperature differences occur across the thickness of these walls resulting in severe thermal stresses. Therefore, the field tests conducted using this design have reported severe metal damage in the flame zone, which resulted in shutdown of the DSG in just 65 hours of operation. In one test the entire burner head had melted away. One of the major recommendations was to lower the combustor wall temperatures by design modifications. The thermal stresses were also responsible for the severe cracking and consequent corrosion of the burner components used in the field tests. These problems are still being tackled, and appear to be the main hurdle for this technology to be accepted by the oil recovery industry.

The process described in the '988 patent does not have this problem of severe thermal stresses in metal walls, which has been the source of major operating problems of other DSG designs. In the described process the flame is surrounded by a rotating body of water, and not by metal walls. Therefore the temperature of the combustion chamber walls is the same as that of the cold water. There is no scope for thermal stresses to develop, and therefore will not result in cracking or corrosion. This is one of the most important advantages of the concept described in the '988 patent over that of other DSG designs. Use of the '988 patent process could insure long and trouble-free operation of the downhole steam generator in the reservoir environment, provided, however, that the process can be successfully adapted to the efficient generation of steam. As noted earlier, however, the process described in the '988 patent is not of sufficient efficiency for generating steam. Such modification of the process described in the '988 patent to allow steam generation, especially downhole, would be of great value to the industry.

SUMMARY OF THE INVENTION

The present invention provides an apparatus for generating steam by directly heating water with a flame, the apparatus comprising a vortex container and a swirl burner. The vortex container has first and second ends, with a liquid inlet mounted through the wall of the container. The liquid inlet is adapted to tangentially inject liquid, in this case water, into the container to create a spiraling flow of the water within the vortex container. The container also has a vortex sustaining inner surface adapted to receive the water injected from the inlet, with the surface defining a vortex chamber which is axially aligned within the container. The apparatus also comprises a burner comprised of a metal block with an axial hole for supplying fuel and at least one tangential inlet hole for supplying air, enriched air or oxygen. The tangential supply of air creates a vortex recirculation zone where the hot gases from the flame are recirculated back to the base of the flame thereby providing a continuous source of ignition of the injected fuel. This recirculation stabilizes the flame at high firing intensities. The apparatus also comprises an outlet at the second end of the container along its axis for receiving a flow of liquid and gas exiting from the vortex chamber.

In the apparatus, the flame is generally deployed within the vortex chamber along its axial core. Thereby, the swirling water surrounds the flame and combustion is carried out inside the rotating body of water. Also, due to the combination of the swirl burner and the vortex swirling water, the size of the apparatus can be such as to fit within a borehole. The steam generator can therefore be of a cylindrical shape which fits comfortably into the borehole. This would allow for the downhole generation of steam using the apparatus.

The present invention also relates to a method for generating steam by directly heating water with a flame. A method comprises continuously injecting water through an inlet into a hollow container and forming along the interior surface of the container a continuous inertially rotating liquid vortex flow of spiraling water which has a substantially liquid free core within the container. The method further comprises passing a gas through the vortex core whereby the gas contacts the inner surface of the liquid along said vortex core and thereby heats the water to create steam. The gas is generally a combustion product, and preferably the gas originates from a combustible mixture which is introduced into and is ignited to produce a flame within the vortex core. The combustion product is achieved by supplying fuel either axially or tangentially, and tangentially supplying an oxygen containing gas to a burner. The gas mixes within the fuel at the burner head and is ignited to produce the flame and thereby the combustion product passed into the vortex core.

DETAILED DESCRIPTION OF THE PREFERRED EMBODIMENTS

The concept and the detailed development of the heat transfer process for heating water, i.e., direct heating of the water with a premix linear flow burner flame, are provided in U.S. Pat. No. 4,604,988, which is hereby incorporated herein in its entirety. The design presented therein is sufficient for heating large quantities of water very quickly. However, the method as described is not of sufficient effectiveness and efficiency for generating steam from water.

The additional requirements of steam/$CO_2$ generation using the direct heating process are:

(1) The burner should be capable of supplying the latent heat of vaporization corresponding to the pressure of operation by burning sufficient fuel (in air or oxygen) in a manner that assures the aerodynamic stability of the high-intensity flame.

(2) The hydrocyclone should be capable of flowing an amount of water that is larger than the amount of steam generated (to account for varying steam quality needs) and yet provide hydrodynamic stability of rotating films and sufficient air-core diameter and length to accommodate the flame zone without premature quenching by water entrainment and/or vortex collapse.

(3) The heat transfer zone, downstream of the combustion/flame zone, should be capable of generating high heat and mass transfer coefficients in order to effectively transfer and evaporate liquid water into steam within reasonable residence times and heat transfer zone lengths.

(4) The entire process (consisting of the hydrocyclone, the burner and the evaporation zone) should be capable of carrying out combustion using air, which is enriched with oxygen at varying concentrations (or even pure oxygen) in order to provide a vapor stream consisting of steam and the "desired" level of $CO_2$. This desired level of $CO_2$ in the steam injected into a petroleum reservoir is governed by its influence on the interactions with and recovery of the particular crude oil or bitumen present in the reservoir. Combustion of any fuel in oxygen or enriched air results in flame temperatures much higher than those encountered with combustion in air. Hence, the hydrocyclone design should be capable of providing failure-free protection of the cyclone body by means of the two rotating water films surrounding the flame-zone.

The following modifications have been found necessary and have been implemented to accomplish the above mentioned requirements.

Figure 1:
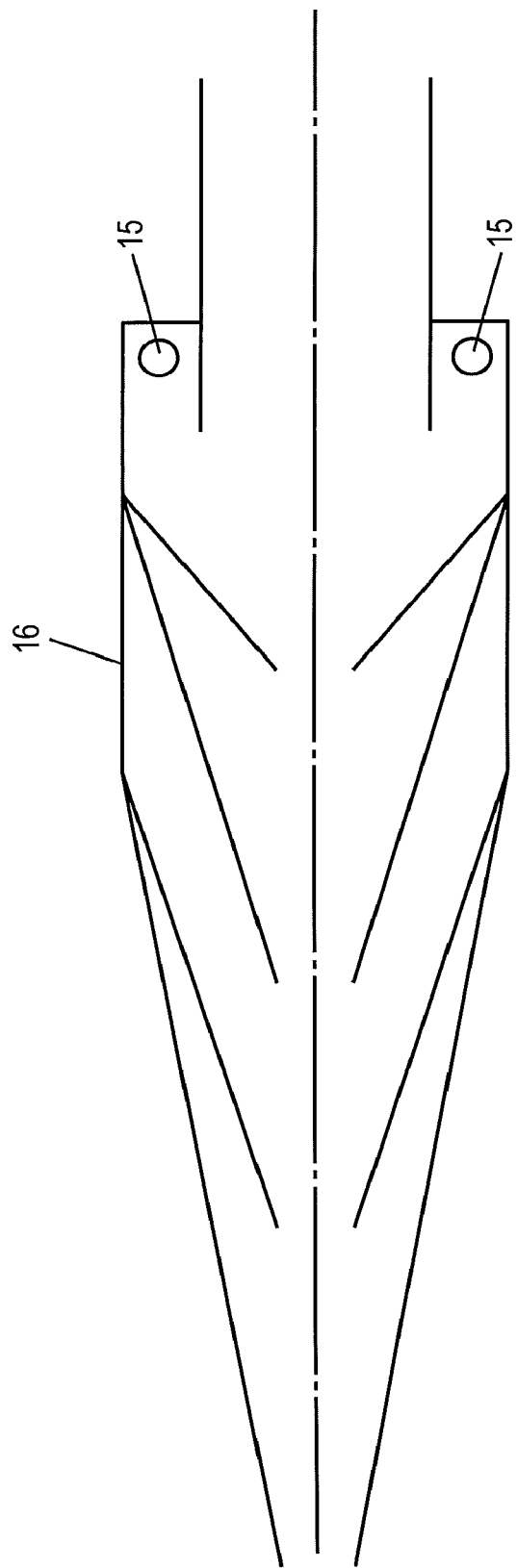
FIG. 1 schematically depicts the various design techniques to enhance the flow capacity of the present process/apparatus.
2.

Hydrocyclone Design Modifications:

The main purpose of these modifications is to optimize the diameter and the length of the cylindrical section and the length and cone angle of the conical section of the hydrocyclone to meet the requirements of steam generation. While an increased diameter of the cylindrical section enables a wider aircore diameter and increased space for the flame, both the diameter and length of the cylindrical section add to its capacity. Increasing the length of the conical section (by decreasing the cone angle for a fixed underflow diameter) also adds to the capacity in addition to providing stability to the two films of water rotating around the aircore. These effects are depicted schematically in FIG. 1. The water films are essential to prevent heat transfer to the metal walls from the combustion/flame zone, thus enabling the system to accommodate the very high-temperature flames resulting from the use enriched air or pure oxygen.

Figure 2:
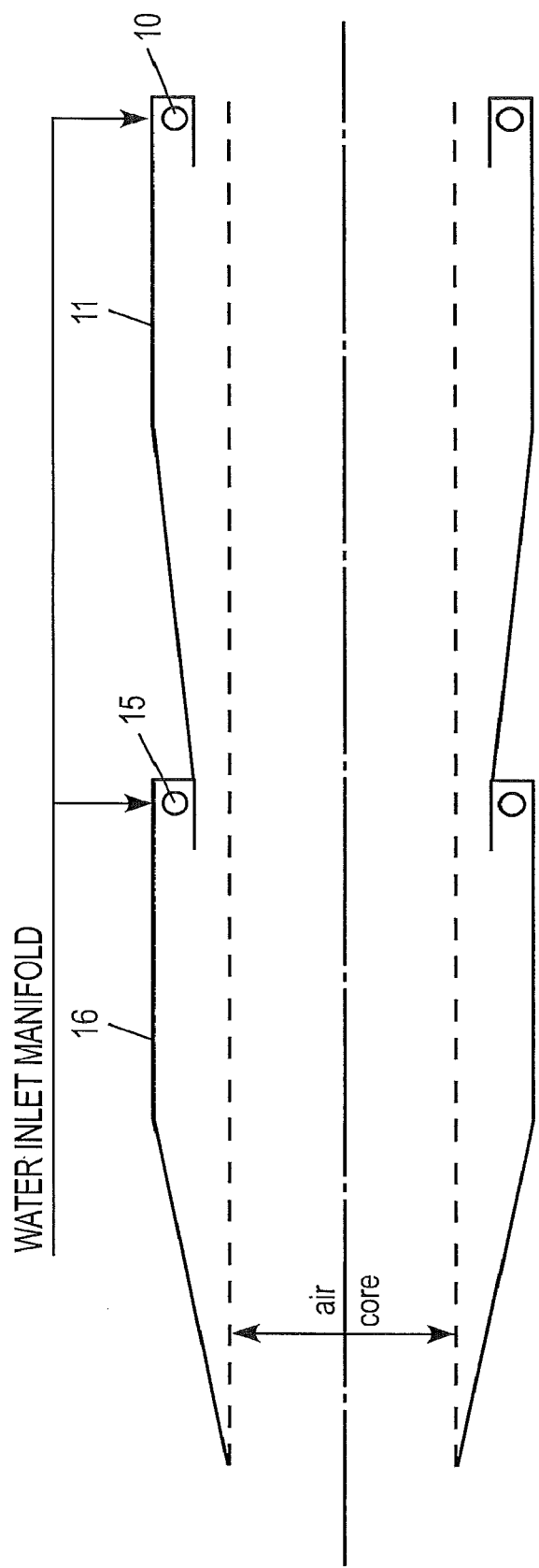
FIG. 2 depicts the tangential injection of water using a split of the water load in the apparatus of the present invention.
3.

In order to keep the diameter of the hydrocyclone within limits imposed by the size of the wellbore (for downhole steam generation applications), one option is to split the total amount of water to be evaporated into two streams, one entering tangentially the first hydrocyclone to provide the water-walls around the flame and the second stream of water injected tangentially into the second hydrocyclone which uses the overflow opening of the first hydrocyclone as its underflow opening, as shown in FIG. 2. In FIG. 2, the water inlet manifold 10 for the first hydrocyclone 11 is shown, as is the water inlet manifold 15 for the second hydrocyclone 16. Such a split of the water load will enable not only a smaller capacity (and hence smaller diameter) hydrocyclone well suited for downhole placement but also achieve the desired level of steam and heat generation. This concept of splitting the flow can be extended to several hydrocyclones in series thereby enabling the direct heating process to generate large quantities of heat (for example 10-100 MMBtu/h) and the steam/$CO_2$ mixture needed in heavy oil and bitumen recovery operations. Furthermore, such a cascading assembly of hydrocyclones would generate a long aircore extending through all the hydrocyclones, which would be needed to burn the increased amount of fuel at increasing heat delivery rates.

It should be noted that our maximizing the aircore diameter and length (that too at increasing liquid handling capacities) are contrary to the well-accepted procedures in the hydrocyclone industry which aims at efficient phase separations by attempting to minimize the aircore size. Nevertheless, it is necessary to achieve steam production.

Burner Design Modifications:

U.S. Pat. No. 4,604,988 describes a relatively low-intensity axial-flow burner that is sufficient for the purpose of heating water at reasonable flow rates amounting to about 250,000 to 350,000 Btu/h. However, for generating steam in large quantities, as required in thermal enhanced recovery of heavy oils and bitumen, heat generation rates are normally in the range of 5 to 10 MMBtu/h in each of the vertical steam injection wells, while the horizontal steam injection wells used in the SAGD process might approach 50-100 MMBtu/h. These heat requirements are 20 to 400 times larger than that described in U.S. Pat. No. 4,604,988. Furthermore, such large heat generation must be accomplished by combustion of a suitable fuel in air, or enriched air or pure oxygen, within the space provided by the aircore in the hydrocyclone. In such restrictive conditions, the gas velocities can be calculated to be much higher than the flame blow off velocities of the axial-flow burners used in U.S. Pat. No. 4,604,988, which means that stable combustion will not be possible at the level of heat generation rates required in steam generation.

In order to overcome these limitations, the process of the present invention combines a high-intensity swirl-flow (or vortex flow) burner with the previously described high-flow-rate modified hydrocyclone (or its cascade assembly) to accomplish the desired result of large heat release rates in narrow wellbores in heavy oil and bitumen bearing reservoirs.

The term "swirl-flow burner" refers to a diffusion flame burner, and one wherein one or more of the gases or fluids supporting combustion is/are introduced tangentially at the burner head. As recognized in the art, in a diffusion flame the reactants are of separate origin; burning occurs only at a diffusion-blurred interface. Ludford, G.S.S., Reacting Flows: Combustion and Chemical Reactors, Part 1, American Mathematical Society, p. 5, (1986).

Figure 3A:
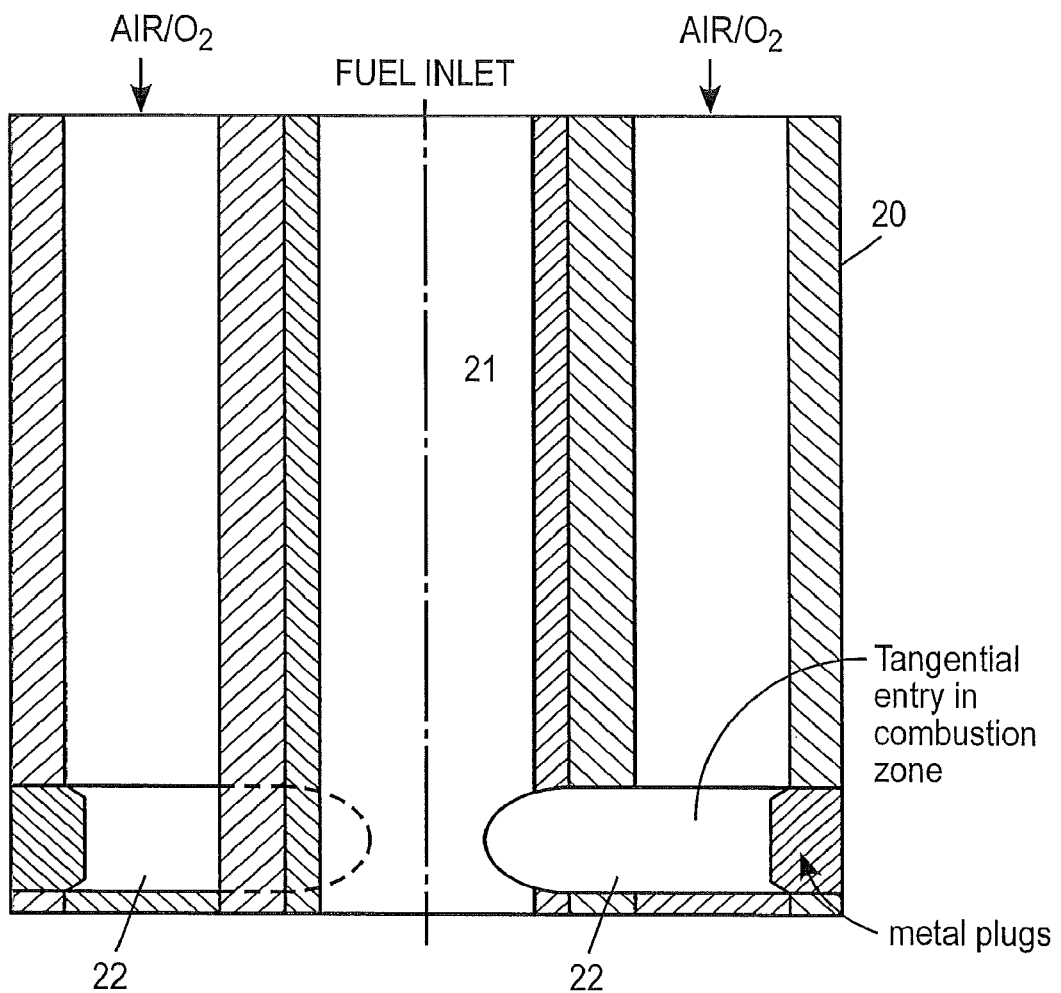
FIGS. 3A, 3B shows two variations of the swirl burner of the present invention.
4.

Two variations of the swirl burner are shown in FIG. 3 (a and b). The first involves a solid metal block 20 with an axial hole 21 for supplying fuel and four tangential inlet holes 22 for supplying air to the combustion zone. A provision is made for inserting a spark plug for ignition near the air-gas mixing area within the burner head. Other ignition methods, such as by means of pyrogolic fluids, for example, can also be used in the present invention. The tangential supply of air creates a vortex recirculation zone where the hot gases from the flame are recirculated back to the base of the flame thereby providing a continuous source of ignition of the injected fuel. This recirculation stabilizes the flame at high firing intensities.

Figure 3B:
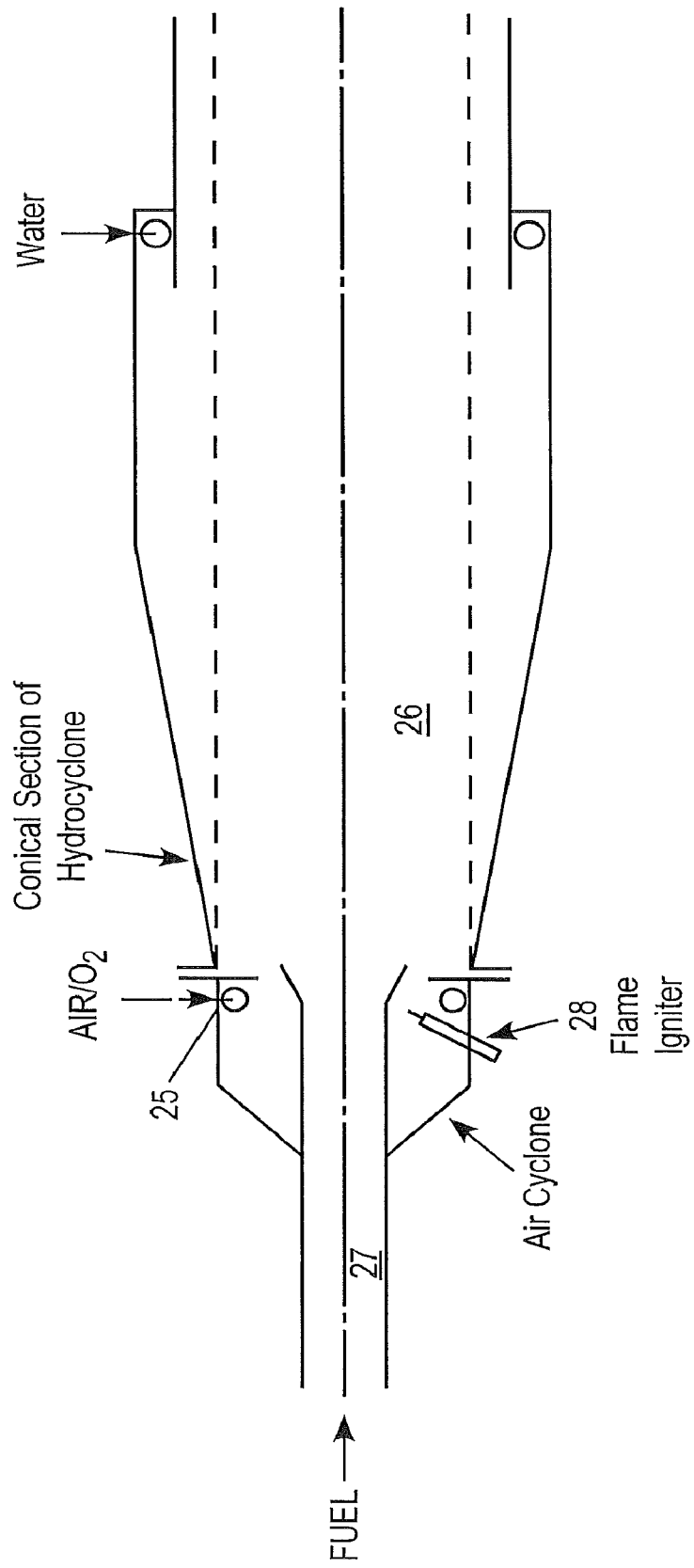

The second model shown in FIG. 3(b) uses the gas cyclone flow pattern to inject air or enriched air tangentially 25 into the combustion chamber 26 and the fuel is injected 27 either linearly in the case of low firing rates or with a swirl created by inline vanes. This flow pattern also is aimed at creating the swirl and the consequent recirculation zone for flame stabilization. A flame igniter is shown at 28.

Such swirl flow combustion chambers can be used to generate large heat release rates in the range of 5 to 200 MMBtu/h as required in thermal enhanced oil recovery of heavy oils and bitumen.

Combustion in Enriched Air:

When fuels are burned in air, only 21% of air, that is oxygen, is consumed in the combustion reactions to generate heat. However, nitrogen, which makes up the remaining 79% of the air, is mostly inert (except the NOx forming reactions that occur at high temperature regions within the combustion zone). When combustion is carried out in oxygen, due to the absence of nitrogen, extremely high flame temperatures (exceeding 4000° F.) are encountered and combustion containment becomes a formidable task. However, in the direct combustion process of the present invention the combustion is carried out inside a rotating body of water and the high temperature flame never contacts the metal walls of the combustion chamber. This fundamental difference in the design concept enables the process of the present invention to use oxygen for combustion (instead of air) which not only brings down the costs associated with air compression for downhole steam generation in deep reservoirs but also has the potential to increase oil production rates significantly due to high partial pressures of carbon-dioxide in the effluent steam/gas mixture. Yet another advantage for using oxygen for combustion is the fact that a large reduction of gas volumes (due to the absence of nitrogen) results in very compact units for use in small diameter wellbores including short radius horizontal wells.

Modifications to the Heat Transfer Region

Figure 4:
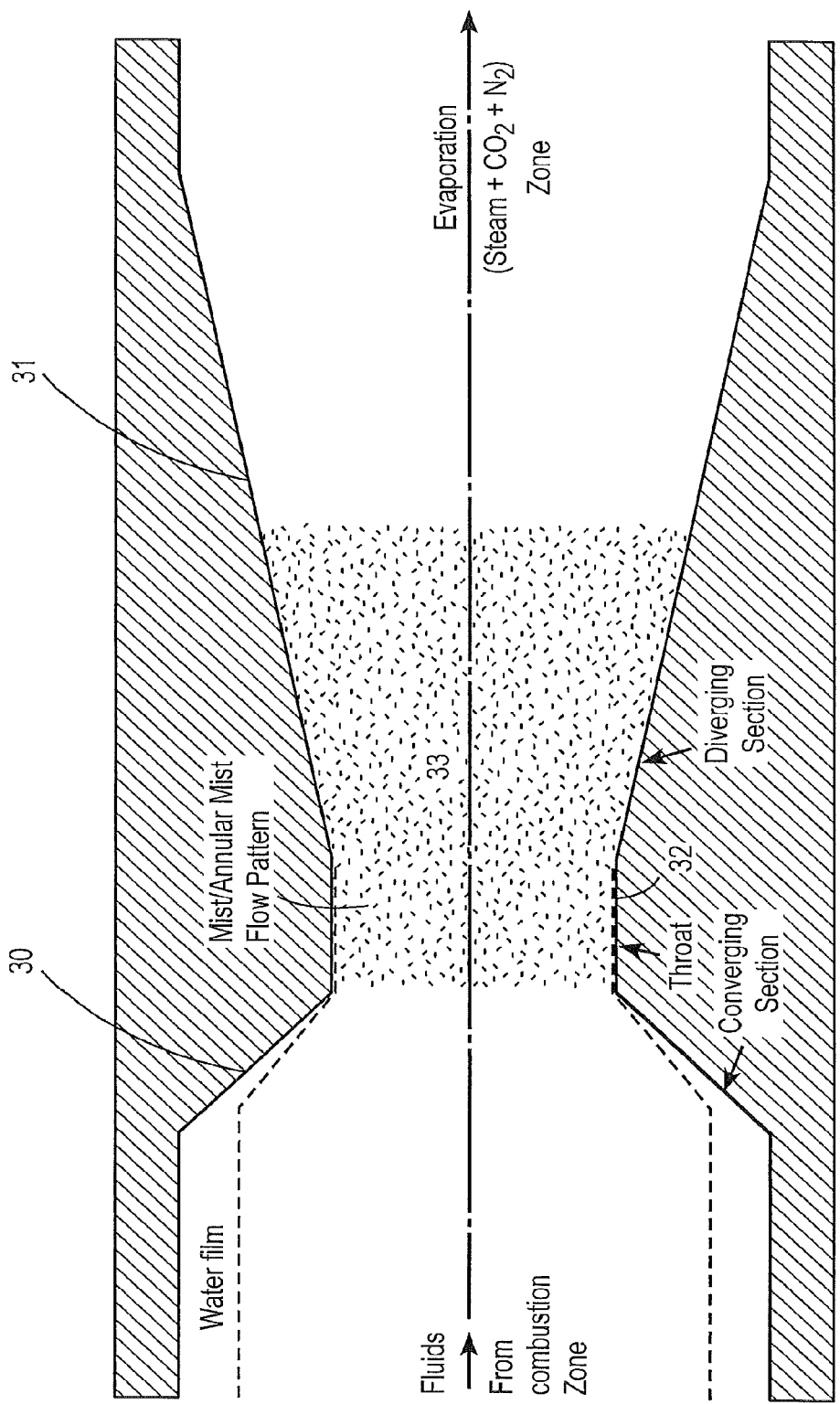
FIG. 4 shows a modified heat transfer zone that follows a combustion zone in a steam generator of the present invention.
5.

The heat transfer zone described in U.S. Pat. No. 4,604,988 relies on partial-moon shaped baffles at the bottom of the horizontal pipe to enable the breakup of the liquid (water) film into droplets to be entrained in the gas stream for better and rapid heat transfer. This type of film breaking does not ensure small and relatively uniform droplet sizes needed for efficient and rapid evaporation of water into steam. Therefore a more reliable and consistent method is required in steam generation applications. This invention combines the concept of a venturi scrubber, commonly used in the removal of particulate matter from gas streams, to ensure the entrainment of water in the form of fine mist-like droplets for rapid and efficient evaporation. FIG. 4 provides one such embodiment of the modified heat transfer zone that follows the combustion zone in the steam generator of the present invention. It comprises converging 30 and diverging 31 sections connected in the middle by a throat 32. As the gas and liquid enter the converging section, their velocities increase and in the properly designed throat section 32 most of the liquid film of water flowing along the walls is broken up into a mist 33 entrained in the high velocity gas stream. This increased surface area enables rapid heat transfer from the hot combustion gases to the water droplets and, if sufficient heat is available in the gas phase, rapid mass transfer occurs converting the entrained droplets into vapor in short residence times resulting in a very compact steam generator. The commercial scrubbers used in particulate removal from gas streams depend on large pressure drops to create fine droplet sizes with the consequent penalty of large power consumption and associated costs. However, the venturi scrubber design provided in this invention for heat and mass transfer makes use of a longer diverging section to recover some of the pressure drop occurring in the throat. Because of a gradual change in cross sectional area of this long diverging section the decreasing velocity is gradually recovered as pressure energy thereby decreasing the overall pressure drop required for liquid entrainment. Up to 90% of the pressure drop in the throat is normally recovered due to this design feature.

Direct Combustion Process for Downhole Steam Generation in SAGD:

Steam assisted gravity drainage (SAGD) process, in its original two-well configuration as well as in its several recent versions, has become a major commercial success. This invention relates to the use of a direct combustion steam/$CO_2$ generator to enhance the SAGD process performance and economics. Because of its high thermal efficiency and large heat transfer coefficients, the present process can be used to make large quantities of high pressure steam within a very compact device, such as a 4-6 inch diameter pipe of 6-20 feet length. This enables the compact steam generator of the present invention to be placed directly in an oil well at the bottom so that all the steam and the hot gases of combustion are injected into the oil reservoir without any prior loss of heat in the wellbore or in surface steam distribution lines as in the case of conventional once-through oil-field steam generators.

Figure 5A:
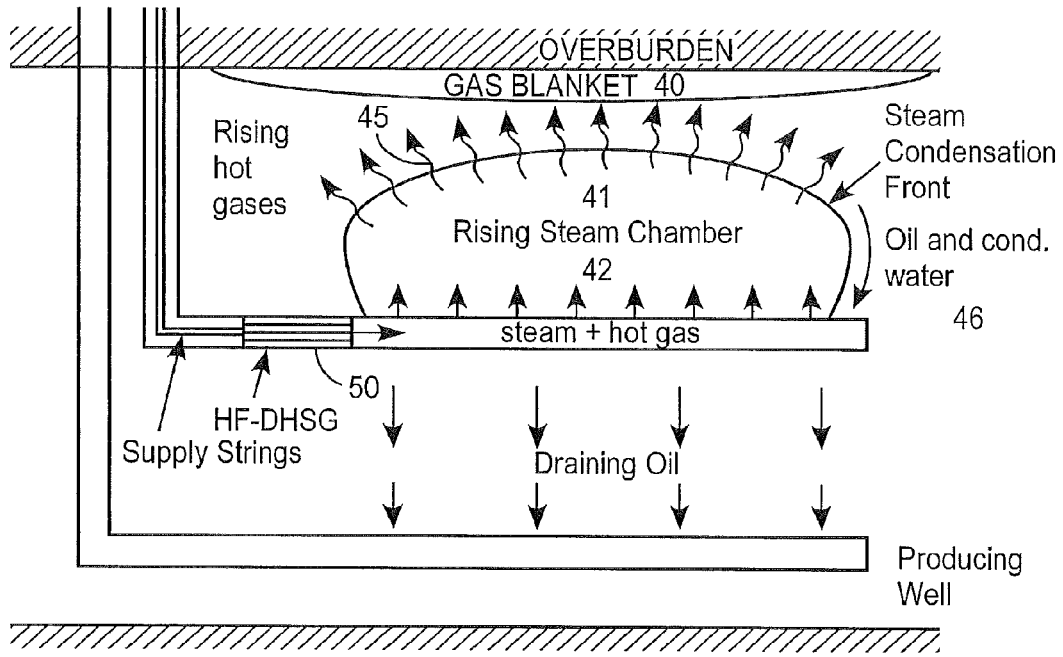
FIGS. 5A, 5B depicts two examples of the application of the process of the present invention in SAGD projects.
6.
Figure 5B:
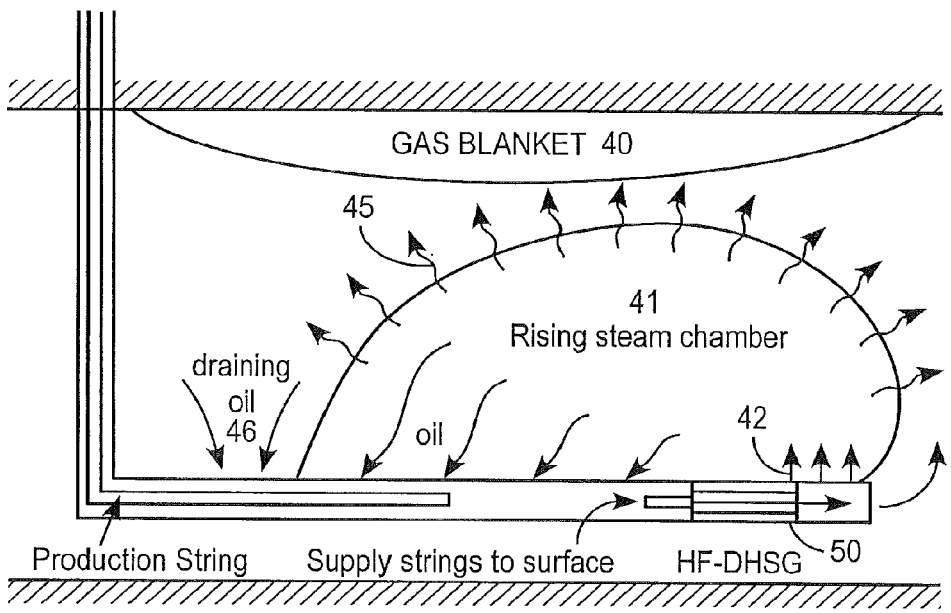

FIG. 5 depicts two examples of the application of the present direct combustion process in SAGD projects: (a) the conventional SAGD project using two horizontal wells and (b) a single-well SAGD project. Both these applications of the present process demonstrate marked improvement in SAGD performance due to (i) the near complete utilization of the heat content of the fuel without stack-gas losses nor any wellbore or steam transmission line losses, and (ii) the effect of the rising hot gases above the steam-condensation front. In FIGS. 5(a) and 5(b), a gas blanket 40 is shown above a rising steam chamber 41, which is created by the injection of steam 42. In FIG. 5, the steam is created by the direct combustion unit of the present invention 50. As hot gases 45 rise, the oil and condensed steam drain 46. These gases, consisting of mainly $CO_2$ and $N_2$ when air is used for combustion and mainly $CO_2$ when burning the fuel in oxygen, rise in the reservoir due to their low density compared to that of the oil or condensing water, essentially preheating the oil above the steam chamber, which in turn lowers the amount of steam needed to further heat the oil. This effect is expected to lower the steam-oil ratio significantly. Furthermore, the gases, being noncodensable, eventually accumulate at the top of the reservoir payzone creating a gradually expanding gas-blanket 40 which acts as a thermal insulator against heat losses to the overburden. This effect is also expected to yield significant reduction in steam-oil ratio. The steam-oil ratio is the main economic indicator of the success or failure of the thermal recovery processes. Hence, the above discussion clearly points out the advantages of the direct combustion process in making every SAGD application an economic success.

Yet another mode of deploying the present direct combustion process in SAGD operations is when multi-lateral directional wells are drilled from the same vertical well for steam injection and the producing horizontal wells are placed in optimized patterns below the injectors. In such an arrangement of horizontal injector wells and horizontal producer wells, a high-capacity (for example, 100 MMBtu/h) device could be placed in the vertical section thereby simultaneously feeding steam+gas stream to several lateral injectors.

Yet another mode of deploying the present direct combustion unit is as a surface installation at or near the injection wellhead. This would enable easy access to the generator as well as enable the deployment of the process as a nearly "self-contained" process as described below.

Figure 6:
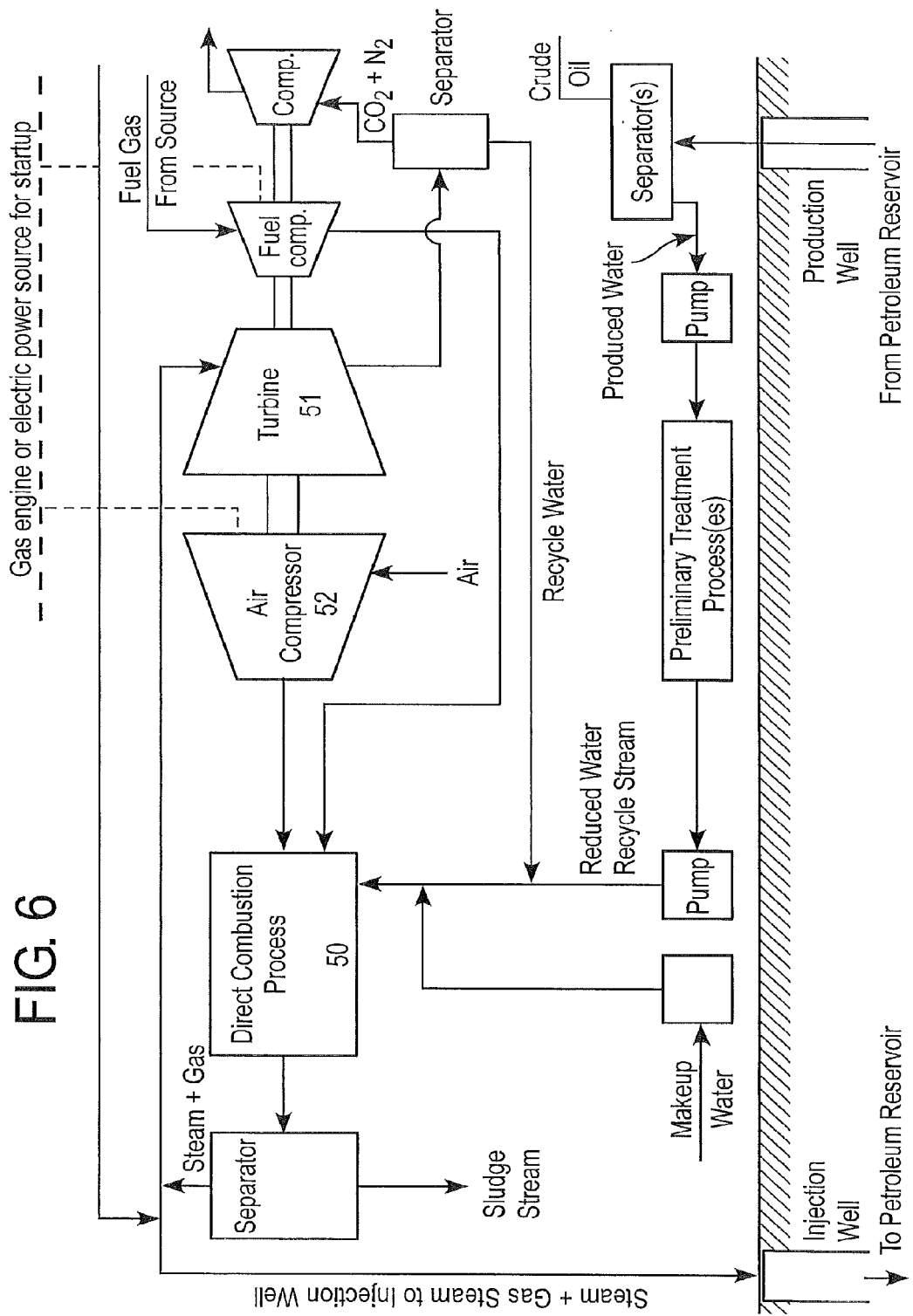
FIG. 6 shows a schematic diagram of the surface installation employing the present invention to gain further enhancements in the efficiency of energy utilization.
7.
Figure 7:
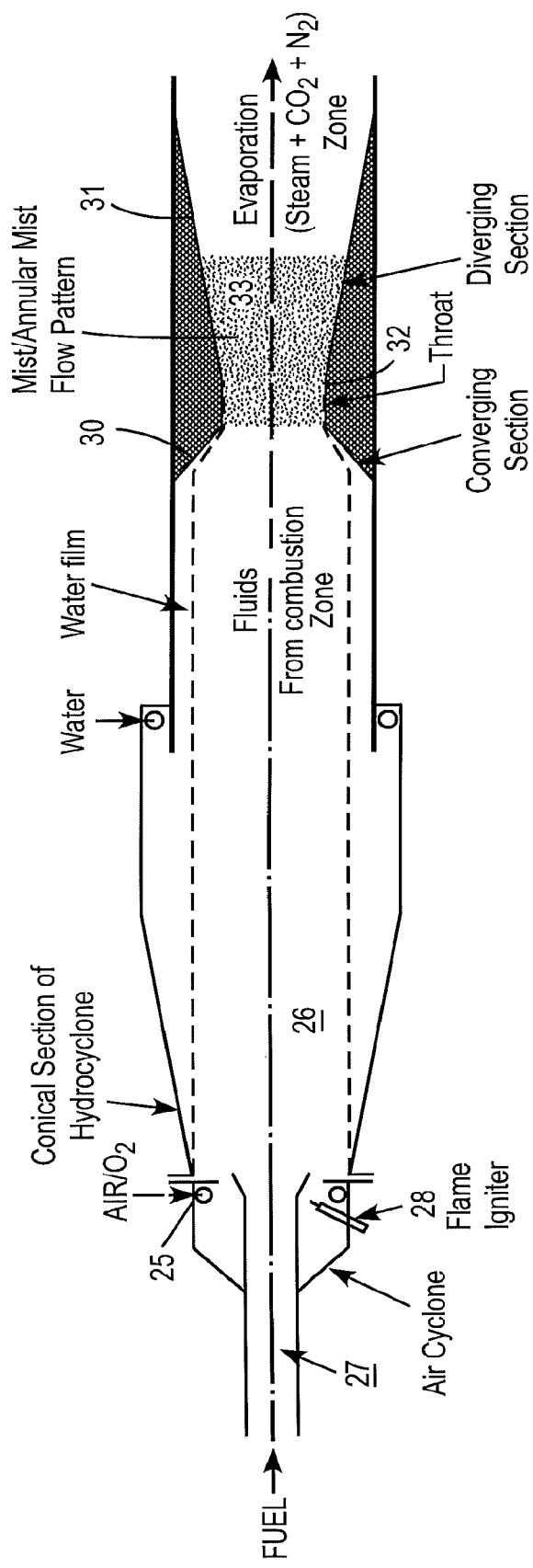
FIG. 7 shows a schematic diagram of the hydrocyclone section and combustion zone in combination with the heat transfer zone and outlet.

FIG. 6 shows a schematic diagram of a surface installation of the present direct combustion process to gain further enhancements in the efficiency of energy utilization during thermal recovery of heavy oils and bitumen. In this configuration, the process 50 is designed to generate significantly higher thermal output than the heat injection requirements of the reservoir. The excess will be utilized in driving a turbine 51 with the steam+combustion-gas stream. This turbine 51, in turn, provides the drive energy required to run the compressors 52 used to compress air, fuel gas and the reject gas stream.

FIG. 6 also shows the process making use of the produced water from the reservoir. This arrangement of recycling oilfield produced water to generate steam provides a two-fold environmental benefit, namely it reduces considerably the need to use fresh-water resources and it provides a solution to the problem of disposing large quantities of reservoir water produced with the crude oil.

Finding fresh water resources near oil fields and obtaining government permission to use them is a major hurdle for large projects. Governments and communities are urging oil producing companies to recycle produced water. Recycling produced waters in the conventional oil-field once-through steam generators will add substantially to the cost of steam production—due to the elaborate water treatment schemes required to obtain boiler feed-water quality. However, due to the very nature of its unique heat transfer direction and characteristics, the present process could recycle produced water with minimal pretreatment.

Although the present invention has been described in considerable detail with clear and concise language, other versions are possible. Therefore, the spirit and scope of the invention should not be limited by the description of the exemplary embodiments contained therein.

What is claimed is:

1. An apparatus for direct contact combustion steam generation comprising:
    a swirl-flow diffusion burner in a combustion zone within a chamber, said burner comprising at least one fuel inlet and at least one oxygen-containing fluid inlet, and wherein at least one of said inlets is adapted to create a vortex recirculation zone within an aerodynamically stable flame deployed along an axial core of said combustion zone within said chamber, and wherein said flame is of sufficient intensity to produce latent heat of vaporization of water corresponding to the pressure of operation; and
    wherein said chamber is defined by a wall comprising an inlet adapted to introduce an axial rotating flow of water along an interior surface of said wall, said flow of water defining said combustion zone and insulating said wall from said flame.

2. The apparatus of claim 1, wherein the fuel inlet is adapted to introduce fuel to a burner head axially or tangentially or both.

3. The apparatus of claim 1, wherein the water inlet is adapted to create a two-layer hydrocyclonic flow of water.

4. The apparatus of claim 3, comprising a plurality of water inlets wherein said chamber and said inlets are adapted to create a cascade of hydrocyclones and wherein an overflow opening of a first hydrocyclone is an underflow opening of a second hydrocyclone.

5. The apparatus of claim 4, wherein the plurality of water inlets are adapted to provide hydrodynamic stability of the rotating fluid and sufficient liquid-free air-core diameter and length to accommodate the combustion zone without quenching the flame.

6. The apparatus of claim 4, wherein said inlets and said chamber wall are adapted to produce a liquid-free core within said chamber.

7. The apparatus of claim 1, wherein said burner is configured to generate heat release rates of 5 MMBtu/h or more.

8. The apparatus of claim 1, wherein said burner is configured to generate heat release rates up to 200 MMBtu/h.

9. The apparatus of claim 1, further comprising a heat transfer zone downstream of said combustion zone comprising a first converging section of reduced diameter and a second diverging section of increasing diameter.

10. The apparatus of claim 9, further comprising a throat of uniform diameter between said converging section and said diverging section.

11. The apparatus of claim 10, wherein the diverging section is longer than the converging section.

12. The apparatus of claim 1, wherein said fuel inlet further comprises inline vanes.

13. The apparatus of claim 12, wherein the inline vanes are adapted to create a swirling flow pattern in said fuel.

14. The apparatus of claim 1, wherein said outlet is in fluid communication with a turbine.

15. The apparatus of claim 14, wherein the turbine is further connected to a compressor.

16. A process for direct contact combustion steam generation comprising:
    establishing an axially rotating water-wall having a liquid free aircore defining a combustion zone at one end of a chamber;
    converting water from said water-wall to steam by deploying an aerodynamically stable diffusion flame within said combustion zone, said flame and its combustion products in direct contact with an interior surface of said water-wall and of sufficient intensity to produce latent heat of vaporization of water corresponding to the pressure of operation; and
    directing steam through an outlet at another end of said chamber.

17. The process of claim 16, further comprising a step of passing combustion gases and water from said water-wall through a heat transfer zone downstream of said combustion zone.

18. The process of claim 17, wherein the heat transfer zone comprises a converging section and a diverging section connected by a throat of uniform diameter less than that of the combustion chamber defined by the rotating water-wall.

19. The process of claim 18, wherein the diverging section is longer than the converging section.

20. The process of claim 17, wherein up to 90% of a pressure drop occurring at the converging section is recovered in the diverging section.

21. The process of claim 16, wherein the aerodynamically stable diffusion flame is fed by an oxygen-enriched fluid.

22. The process of claim 21, wherein the oxygen-enriched fluid is oxygen or oxygen-enriched air.

23. The process of claim 16, wherein the aerodynamically stable diffusion flame produces temperatures of 4,000° F. or greater.

24. The process of claim 16, wherein the aerodynamically stable diffusion flame generates heat release rates up to 5 MMBtu/h or more.

25. The process of claim 16, wherein the aerodynamically stable diffusion flame generates heat release rates up to 200 MMBtu/h.

26. A process for direct contact combustion steam generation comprising:
    injecting water through inlets in a wall defining a substantially cylindrical chamber to establish a continuous axially rotating water-wall along an interior surface of said wall, said water-wall having a liquid free aircore defining a combustion zone at one end of the chamber;
    deploying a flame axially aligned with said combustion zone from a diffusion burner wherein an inlet introduces fuel or oxygen-containing gas tangential to said flame, wherein said flame is of sufficient intensity to produce latent heat of vaporization of water corresponding to the pressure of operation;

creating steam by contacting the flame and combustion products with said rotating water-wall and directing combustion products and said water through a heat transfer zone having a converging section and a diverging section; and directing the steam and combustion products through an outlet of said chamber downstream from said heat transfer zone.

27. The process of claim 26, wherein the heat transfer zone comprises a converging section and a diverging section connected by a throat of reduced diameter relative to the combustion chamber.

28. The process of claim 26, wherein the oxygen-containing gas is introduced tangentially to the flame.

29. The process of claim 26, wherein the oxygen-containing gas is an oxygen-enriched fluid.

30. The process of claim 26, wherein the diffusion burner produces temperatures of 4,000° F. or greater.

31. The process of claim 26, wherein the diffusion burner generates heat release rates of 5 MMBtu/h or more.

32. The process of claim 26, wherein the diffusion burner generates heat release rates up to 200 MMBtu/h.

33. The process of claim 26, further comprising the step of configuring said water inlet and said wall to establish a two layer, hydrocyclonic water-wall.

34. The process of claim 26, wherein said combustion gases and steam passing through said outlet are in fluid communication with a turbine.

35. The process of claim 34, wherein the turbine is further connected to a compressor.

* * * * *